(12) United States Patent
Macias

(10) Patent No.: US 11,190,228 B1
(45) Date of Patent: Nov. 30, 2021

(54) PERSONAL BAG ASSEMBLY

(71) Applicant: Patricia Macias, Seattle, WA (US)

(72) Inventor: Patricia Macias, Seattle, WA (US)

(*) Notice: Subject to any disclaimer, the term of this patent is extended or adjusted under 35 U.S.C. 154(b) by 0 days.

(21) Appl. No.: 16/942,288

(22) Filed: Jul. 29, 2020

(51) Int. Cl.
| A45C 15/00 | (2006.01) |
| B65D 25/54 | (2006.01) |
| H04B 1/3888 | (2015.01) |
| A45C 11/00 | (2006.01) |
| A45C 13/30 | (2006.01) |
| A45C 13/24 | (2006.01) |
| A45C 15/06 | (2006.01) |

(52) U.S. Cl.
CPC .......... *H04B 1/3888* (2013.01); *A45C 11/00* (2013.01); *A45C 13/24* (2013.01); *A45C 13/30* (2013.01); *A45C 15/06* (2013.01); *A45C 2011/002* (2013.01); *A45C 2200/10* (2013.01)

(58) Field of Classification Search
CPC ......... A45C 11/00; A45C 13/24; A45C 13/30; A45C 15/06; A45C 2011/002; A45C 2200/10; H04B 1/3888
USPC ............ 206/37, 38, 320, 778; 190/109, 124; 224/418, 575, 576, 578, 901, 602
See application file for complete search history.

(56) References Cited

U.S. PATENT DOCUMENTS

| 5,001,462 | A | * | 3/1991 | Seemann | G08B 5/004 |
| | | | | | 340/574 |
| 7,404,506 | B1 | * | 7/2008 | Ross | A45C 13/28 |
| | | | | | 177/164 |
| 7,699,524 | B2 | * | 4/2010 | Moore, Sr. | A45C 3/02 |
| | | | | | 383/13 |
| 9,333,925 | B2 | | 5/2016 | Wright | |
| D763,569 | S | | 8/2016 | Tal | |
| 9,877,558 | B1 | | 1/2018 | Harstvedt | |
| 9,949,541 | B2 | | 4/2018 | Kantor | |
| 2002/0108828 | A1 | * | 8/2002 | Soskin | A45C 1/024 |
| | | | | | 190/112 |
| 2009/0152144 | A1 | * | 6/2009 | Anderson | A63B 55/40 |
| | | | | | 206/315.3 |
| 2009/0166139 | A1 | | 7/2009 | Cleary | |
| 2010/0163591 | A1 | * | 7/2010 | Stutz | A45F 3/04 |
| | | | | | 224/579 |
| 2010/0187065 | A1 | * | 7/2010 | Pidgeon | A61B 50/31 |
| | | | | | 190/115 |
| 2013/0221048 | A1 | | 8/2013 | Revels | |
| 2014/0001079 | A1 | | 1/2014 | Green | |
| 2014/0231277 | A1 | | 8/2014 | Ponski | |
| 2017/0013944 | A1 | | 1/2017 | Day | |
| 2019/0014888 | A1 | * | 1/2019 | Duncan | A45F 3/14 |

FOREIGN PATENT DOCUMENTS

WO    WO2013121314    8/2013

* cited by examiner

Primary Examiner — Luan K Bui

(57) ABSTRACT

A personal bag assembly for carrying a personal electronic device includes a pouch for carrying objects. A pocket is coupled to the pouch to contain a personal electronic device. The pocket is comprised of a capacitive material to facilitate a touch screen to be manipulated. A strap is removably attachable to the pouch and the strap can be worn across a user's body. A plurality of light emitters is each coupled to the strap to emit light outwardly therefrom. An alarm is coupled to the strap to emit an audible alarm outwardly therefrom.

8 Claims, 5 Drawing Sheets

PERSONAL BAG ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to bag devices and more particularly pertains to a new bag device for carrying a personal electronic device.

(2) Description of Related Art Including Information Disclosed Under 37 CFR 1.97 and 1.98

The prior art relates to bag devices including a storage pouch that is mountable on a steering wheel of a vehicle. The prior art discloses a backpack that has a transparent window integrated therein for displaying an image. The prior art discloses a smart phone case with a pivotal door for opening and closing the smart phone case. The prior art also discloses a purse that has a transparent window integrated therein for displaying a personal electronic device. The prior art discloses a variety of bags with shoulder straps and a transparent window integrated therein for displaying a personal electronic device. The prior art discloses a hair salon cape that has a transparent pocket integrated therein for storing a personal electronic device.

BRIEF SUMMARY OF THE INVENTION

An embodiment of the disclosure meets the needs presented above by generally comprising a pouch for carrying objects. A pocket is coupled to the pouch to contain a personal electronic device. The pocket is comprised of a capacitive material to facilitate a touch screen to be manipulated. A strap is removably attachable to the pouch and the strap can be worn across a user's body. A plurality of light emitters is each coupled to the strap to emit light outwardly therefrom. An alarm is coupled to the strap to emit an audible alarm outwardly therefrom.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
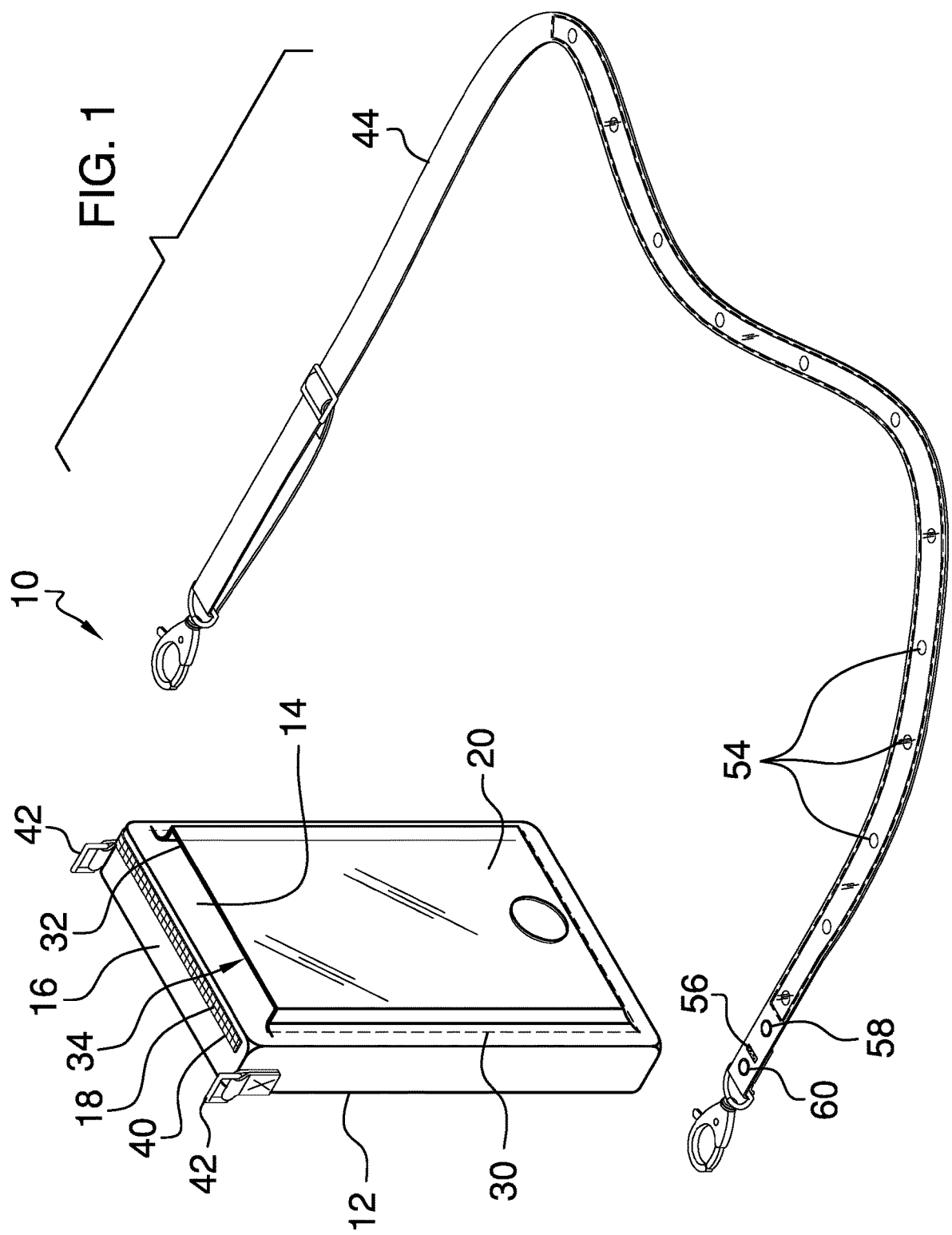
FIG. 1 is a perspective view of a personal bag assembly according to an embodiment of the disclosure.
Figure 2:
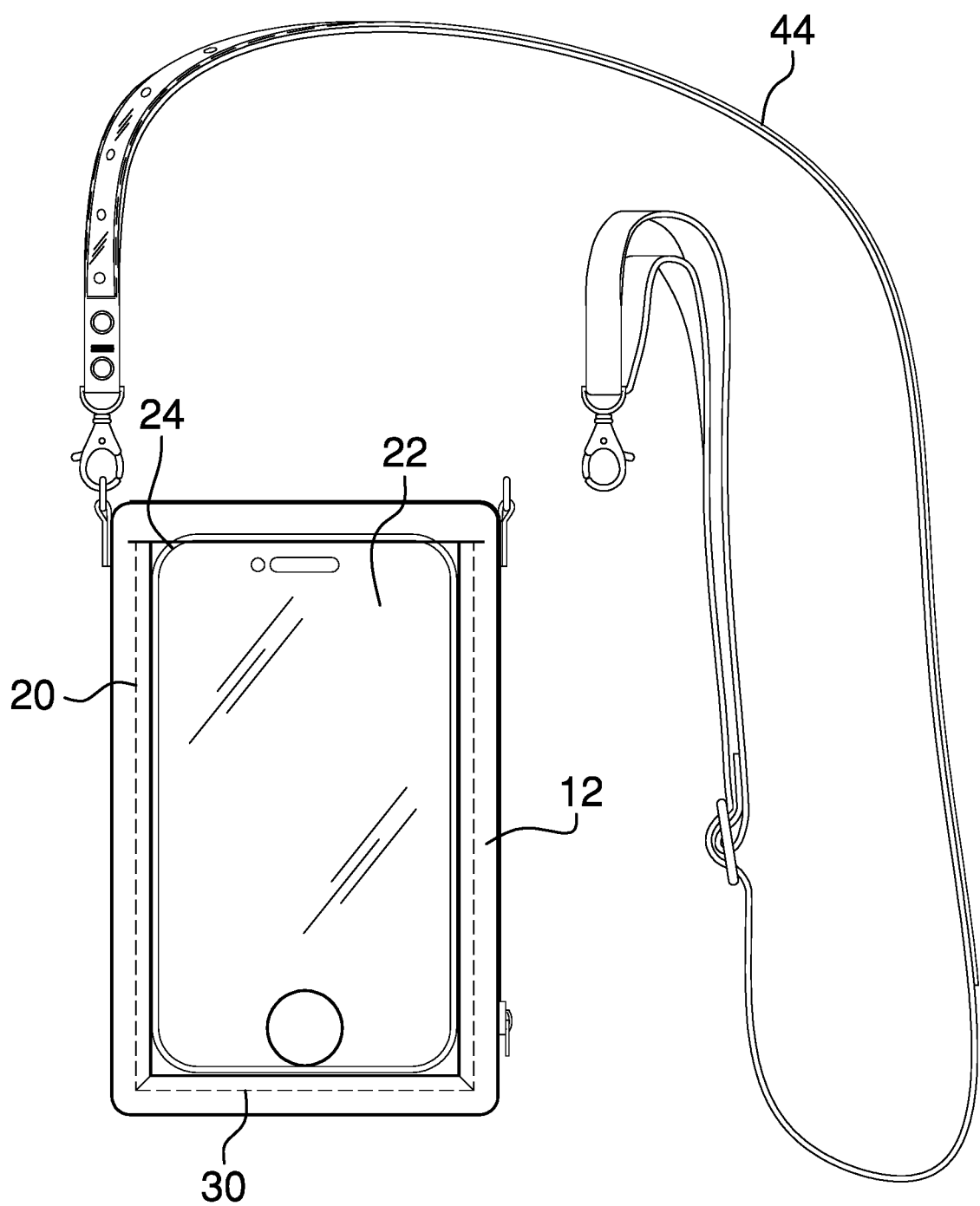
FIG. 2 is a front view of an embodiment of the disclosure.
Figure 3:
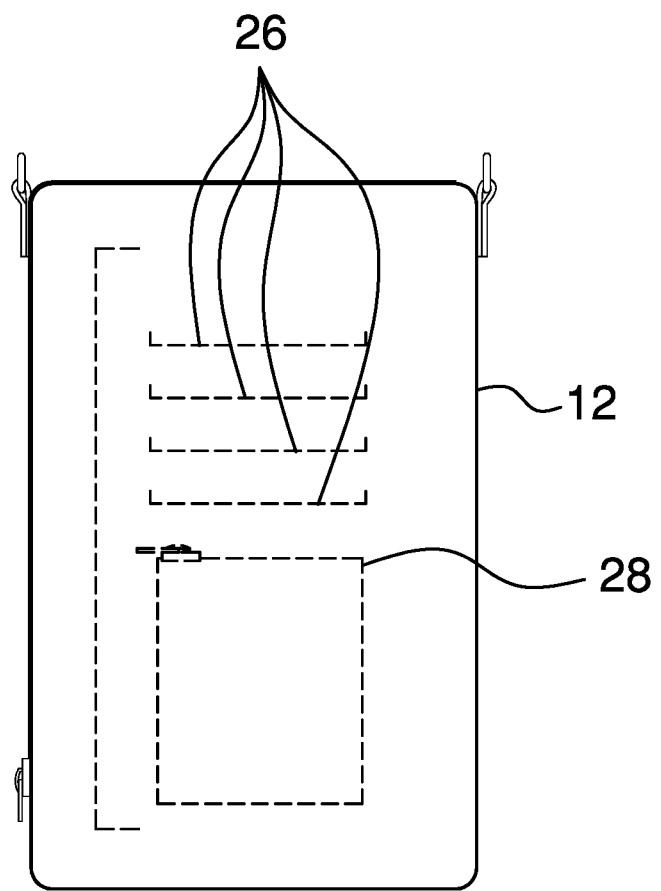
FIG. 3 is a back phantom view of an embodiment of the disclosure.
Figure 4:
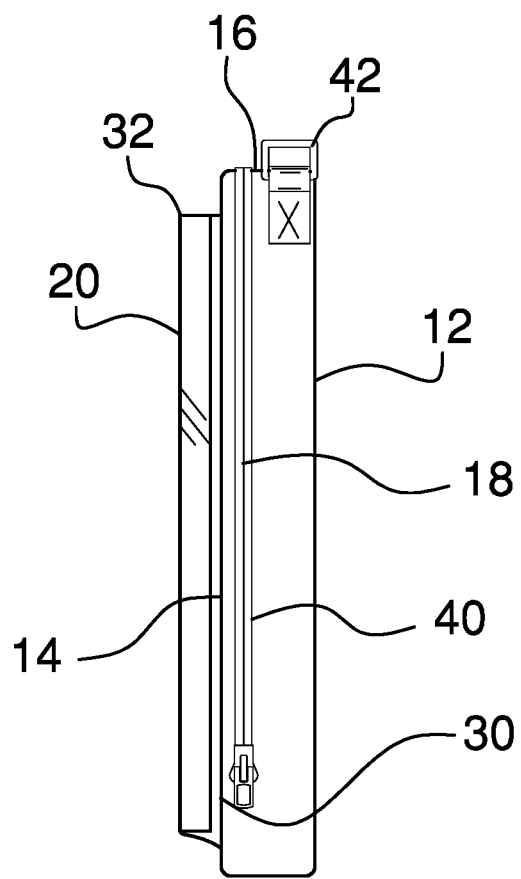
FIG. 4 is a left side view of an embodiment of the disclosure.
Figure 5:
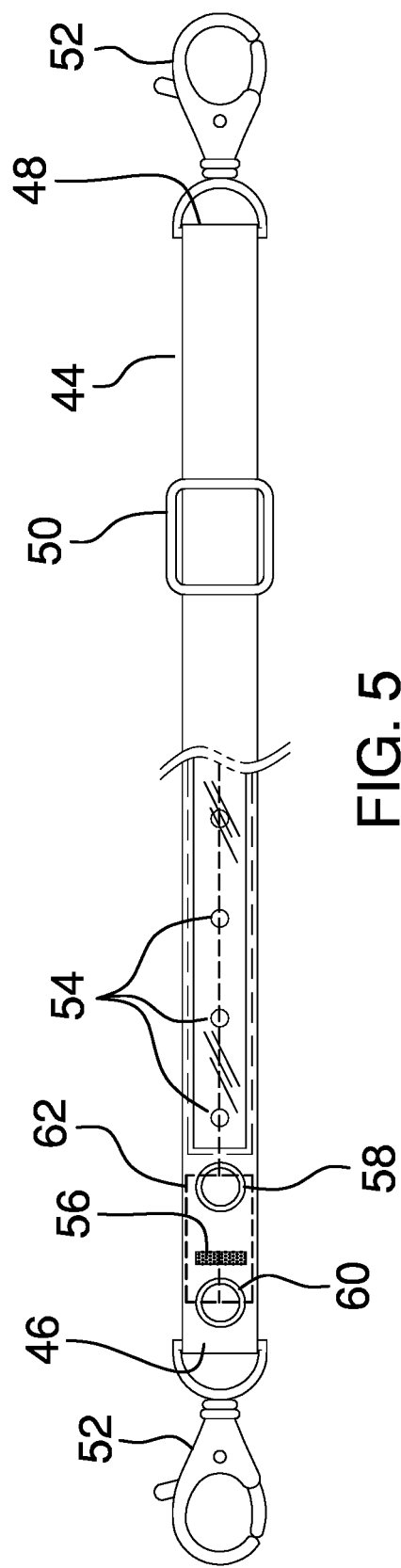
FIG. 5 is a top view of a strap of an embodiment of the disclosure.
Figure 6:
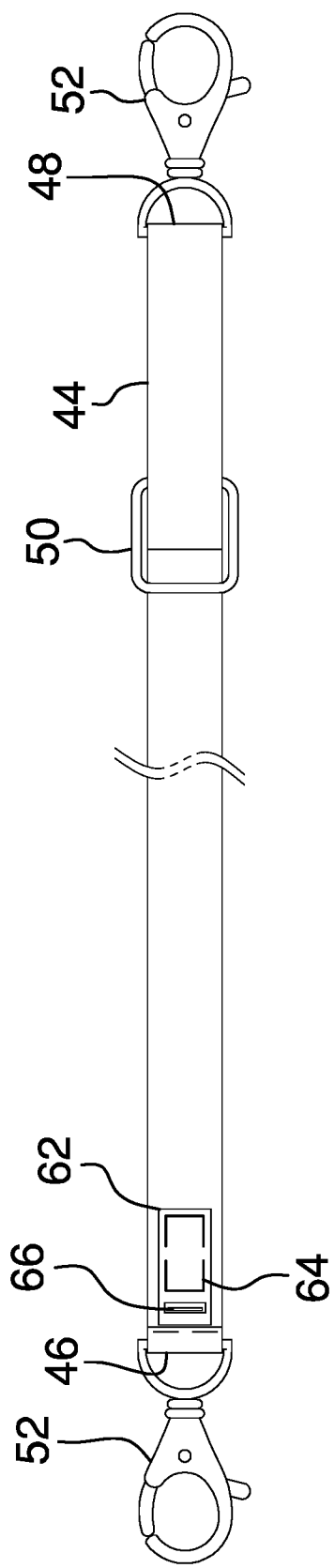
FIG. 6 is a bottom phantom view of a strap of an embodiment of the disclosure.

With reference now to the drawings, and in particular to FIGS. 1 through 6 thereof, a new bag device embodying the principles and concepts of an embodiment of the disclosure and generally designated by the reference numeral 10 will be described.

As best illustrated in FIGS. 1 through 6, the personal bag assembly 10 generally comprises a pouch 12 for carrying objects. The pouch 12 has a front wall 14 and a top wall 16, and the top wall 16 has a cut 18 extending therethrough for accessing an interior of the pouch 12. A pocket 20 is coupled to the pouch 12 to contain a personal electronic device 24. The pocket 20 is comprised of a translucent material to facilitate a touch screen 22 on the personal electronic device 24 to be visible. Moreover, the pocket 20 is comprised of a capacitive material to facilitate the touch screen 22 to be manipulated. The personal electronic device 24 may comprise a smart phone or other similar device. As is most clearly shown in FIG. 3, a plurality of card slots 26 and a coin pocket 28 may be integrated into an interior of the pouch 12 for carrying credit cards and coins, respectively.

The pocket 20 has an outer edge 30 and the outer edge 30 is coupled to the front wall 14. The outer edge 30 has a top side 32 and the top side 32 is free from the front wall 14 to define an opening 34 into the pocket 20. The pocket 20 has a hole 36 extending therethrough and the hole 36 is aligned with a microphone 38 of the personal electronic device 24 when the personal electronic device 24 is in the pocket 20. A closure 40 is coupled to the top wall 16 of the pouch 12 and the closure 40 is aligned with the cut 18. The closure 40 is positionable in a closed position to close the cut 18 and the closure 40 is positionable in an open position to open the cut 18. The closure 40 may comprise a zipper or other similar type of mechanical closure.

A pair of engagements 42 is each coupled to and extends upwardly from the pouch 12, and each of the engagements 42 is positioned adjacent to the top wall 16. A strap 44 is removably attachable to the pouch 12 and the strap 44 can be worn across a user's body. The strap 44 has a length of at least 50.0 inches thereby facilitating the strap 44 to be worn over one shoulder and under the other shoulder in a cross body manner. In this way the pouch 12 is inhibited from being stolen or dropped. The strap 44 has a first end 46 and a second end 48, and the strap 44 has an adjustment buckle 50 thereon for adjusting a length of the strap 44.

A pair of couplers 52 is each coupled to a respective one of the first end 46 and the second end 48. Each of the couplers 52 releasably engages a respective one of the engagements 42. A plurality of light emitters 54 is each coupled to the strap 44 to emit light outwardly therefrom. The light emitters 54 are spaced apart from each other and are distributed along the strap 44. Additionally, the light emitters 54 may comprise an LED or other type of electronic light emitter. An alarm 56 is coupled to the strap 44 to emit an audible alarm 56 outwardly therefrom. The alarm 56 may comprise an electronic speaker or other similar electronic device.

A light button 58 is movably coupled to the strap 44 and the light button 58 is electrically coupled to the plurality of light emitters 54 for turning the plurality of light emitters 54 on and off. An alarm button 60 is movably coupled to the strap 44 and the alarm button 60 is electrically coupled to the alarm 56 for turning the alarm 56 on and off. A power supply 62 is coupled to the strap 44 and the power supply 62 is electrically coupled to the light button 58 and the alarm button 60.

The power supply 62 comprises a rechargeable battery 64 that is integrated into the strap 44. The rechargeable battery 64 is electrically coupled to the light button 58 and the alarm button 60. A charge port 66 is integrated into the strap 44 and the charge port 66 is electrically coupled to the rechargeable battery 64. The charge port 66 insertably receives a charge cord for charging the rechargeable battery 64. The charge port 66 may comprise a usb port or other similar, standardized charge port.

In use, the strap 44 is worn across the user's body to position the pouch 12 on the user's torso. The personal electronic device 24 is inserted into the pocket 20 for storage. In this way the user can manipulate the touch screen 22 through the pocket 20. Moreover, the touch screen 22 is visible through the pocket 20. The light emitters 54 can be turned on to illuminate a walkway in a darkened environment. The alarm 56 can be turned on to emit the audible alarm 56 and subsequently deter a potential assailant or to call for assistance.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A personal bag assembly having a transparent window for manipulating a touch screen, said assembly comprising:
   a pouch for carrying objects;
   a pocket being coupled to said pouch wherein said pocket is configured to contain a personal electronic device, said pocket being comprised of a translucent material wherein said pocket is configured to facilitate a touch screen on the personal electronic device to be visible, said pocket being comprised of a capacitive material wherein said pocket is configured to facilitate the touch screen to be manipulated;
   a strap being removably attachable to said pouch wherein said strap is configured to be worn across a user's body;
   a plurality of light emitters, each of said light emitters being coupled to said strap wherein each of said light emitters is configured to emit light outwardly therefrom, said light emitters being spaced apart from each other and being distributed along said strap; and
   a alarm being coupled to said strap wherein said alarm is configured to emit an audible alarm outwardly therefrom.

2. The assembly according to claim 1, wherein:
   said pouch has a front wall and a top wall, said top wall having a cut extending therethrough for accessing an interior of said pouch; and
   said pocket has an outer edge, said outer edge being coupled to said front wall, said outer edge having a top side, said top side being free from said front wall to define an opening into said pocket, said pocket having an hole extending therethrough wherein said hole is configured to be aligned with a microphone of the personal electronic device.

3. The assembly according to claim 2, further comprising a closure being coupled to said top wall of said pouch, said closure being aligned with said cut, said closure being positionable in a closed position to close said cut, said closure being positionable in an open position to open said cut.

4. The assembly according to claim 2, further comprising a pair of engagements, each of said engagements being coupled to and extending upwardly from said pouch, each of said engagements being positioned adjacent to said top wall.

5. The assembly according to claim 4, wherein:
   said strap has a first end and a second end, said strap having an adjustment buckle thereon for adjusting a length of said strap; and
   a pair of couplers, each of said couplers being coupled to a respective one of said first end and said second end, each of said couplers releasably engaging a respective one of said engagements.

6. The assembly according to claim 1, further comprising:
   a light button being movably coupled to said strap, said light button being electrically coupled to said plurality of light emitters for turning said plurality of light emitters on and off;

an alarm button being movably coupled to said strap, said alarm button being electrically coupled to said alarm for turning said alarm on and off; and a power supply being coupled to said strap, said power supply being electrically coupled to said light button and said alarm button.

7. The assembly according to claim 6, wherein said power supply comprises:

a rechargeable battery being integrated into said strap, said rechargeable battery being electrically coupled to said light button and said alarm button; and a charge port being integrated into said strap, said charge port being electrically coupled to said rechargeable battery, said charge port insertably receiving a charge cord for charging said rechargeable battery.

8. A personal bag assembly having a transparent window for manipulating a touch screen, said assembly comprising:

a pouch for carrying objects, said pouch having a front wall and a top wall, said top wall having a cut extending therethrough for accessing an interior of said pouch;

a pocket being coupled to said pouch wherein said pocket is configured to contain a personal electronic device, said pocket being comprised of a translucent material wherein said pocket is configured to facilitate a touch screen on the personal electronic device to be visible, said pocket being comprised of a capacitive material wherein said pocket is configured to facilitate the touch screen to be manipulated, said pocket having an outer edge, said outer edge being coupled to said front wall, said outer edge having a top side, said top side being free from said front wall to define an opening into said pocket, said pocket having a hole extending therethrough wherein said hole is configured to be aligned with a microphone of the personal electronic device;

a closure being coupled to said top wall of said pouch, said closure being aligned with said cut, said closure being positionable in a closed position to close said cut, said closure being positionable in an open position to open said cut;

a pair of engagements, each of said engagements being coupled to and extending upwardly from said pouch, each of said engagements being positioned adjacent to said top wall;

a strap being removably attachable to said pouch wherein said strap is configured to be worn across a user's body, said strap having a first end and a second end, said strap having an adjustment buckle thereon for adjusting a length of said strap;

a pair of couplers, each of said couplers being coupled to a respective one of said first end and said second end, each of said couplers releasably engaging a respective one of said engagements;

a plurality of light emitters, each of said light emitters being coupled to said strap wherein each of said light emitters is configured to emit light outwardly therefrom, said light emitters being spaced apart from each other and being distributed along said strap;

a alarm being coupled to said strap wherein said alarm is configured to emit an audible alarm outwardly therefrom;

a light button being movably coupled to said strap, said light button being electrically coupled to said plurality of light emitters for turning said plurality of light emitters on and off;

an alarm button being movably coupled to said strap, said alarm button being electrically coupled to said alarm for turning said alarm on and off; and a power supply being coupled to said strap, said power supply being electrically coupled to said light button and said alarm button, said power supply comprising:

a rechargeable battery being integrated into said strap, said rechargeable battery being electrically coupled to said light button and said alarm button; and a charge port being integrated into said strap, said charge port being electrically coupled to said rechargeable battery, said charge port insertably receiving a charge cord for charging said rechargeable battery.

\* \* \* \* \*